US010450044B2

(12) United States Patent
Leclere et al.

(10) Patent No.: US 10,450,044 B2
(45) Date of Patent: Oct. 22, 2019

(54) ELECTRICAL POWER DISTRIBUTION SYSTEM, METHOD FOR POWERING A CORRESPONDING TASK, PROPULSION SYSTEM AND METHOD FOR A SHIP

(71) Applicant: GE Energy Power Conversion Technology Ltd, Rugby, Warwickshire (GB)

(72) Inventors: Loic Leclere, Belfort (FR); Jean-Marie Frizon, Belfort (FR)

(73) Assignee: GE ENERGY POWER CONVERSION TECHNOLOGY LTD., Rugby (GB)

(*) Notice: Subject to any disclaimer, the term of this patent is extended or adjusted under 35 U.S.C. 154(b) by 0 days.

(21) Appl. No.: 15/475,497

(22) Filed: Mar. 31, 2017

(65) Prior Publication Data
US 2017/0283023 A1 Oct. 5, 2017

(30) Foreign Application Priority Data

Mar. 31, 2016 (EP) ..................................... 16305376

(51) Int. Cl.
*B63H 21/20* (2006.01)
*B63H 21/06* (2006.01)
(Continued)

(52) U.S. Cl.
CPC .............. *B63H 21/20* (2013.01); *B60L 1/003* (2013.01); *B60L 3/003* (2013.01); *B60L 3/0061* (2013.01);
(Continued)

(58) Field of Classification Search
CPC ........ B63H 21/20; B63H 21/06; B63H 21/17; B60L 50/13; B60L 1/003; B60L 3/003;
(Continued)

(56) References Cited

U.S. PATENT DOCUMENTS

| 7,112,944 B1* | 9/2006 | Kojori ................. H02M 5/4505 290/31 |
| 2015/0249416 A1* | 9/2015 | Barker .................... H02M 5/42 290/44 |

FOREIGN PATENT DOCUMENTS

| DE | 10 2012 222948 A1 | 6/2014 |
| EP | 1 641 098 A1 | 3/2006 |

(Continued)

OTHER PUBLICATIONS

EP 2057068 English translation.*
(Continued)

*Primary Examiner* — Viet P Nguyen
(74) *Attorney, Agent, or Firm* — Wood IP LLC

(57) ABSTRACT

This electrical energy distribution system comprises assembly of electrical energy generators each driven by a heat engine and supplying a distribution network; means for recovering the heat energy generated during the operation of the heat engines and for vaporizing a working fluid; steam turbine driven by the working fluid and associated with a generator connected to the distribution network for converting the recovered heat energy into electrical energy and at least one frequency converter arranged between the distribution network and an electrical load.
It comprises means for controlling the frequency of the distribution network, where the flow rate of the vaporized working fluid is regulated to a maximum value.

11 Claims, 3 Drawing Sheets

(51) Int. Cl.
| | |
|---|---|
| B63H 21/17 | (2006.01) |
| F01D 15/10 | (2006.01) |
| F01K 7/16 | (2006.01) |
| F01N 5/02 | (2006.01) |
| H02J 3/38 | (2006.01) |
| B60L 1/00 | (2006.01) |
| B60L 3/00 | (2019.01) |
| B63J 3/02 | (2006.01) |
| F01K 15/04 | (2006.01) |
| B60L 50/13 | (2019.01) |
| B63J 3/00 | (2006.01) |

(52) U.S. Cl.
CPC .............. *B60L 50/13* (2019.02); *B63H 21/06* (2013.01); *B63H 21/17* (2013.01); *B63J 3/02* (2013.01); *F01D 15/10* (2013.01); *F01K 7/165* (2013.01); *F01K 15/04* (2013.01); *F01N 5/02* (2013.01); *H02J 3/38* (2013.01); *B60L 2200/32* (2013.01); *B60L 2210/22* (2013.01); *B60L 2240/12* (2013.01); *B63B 2755/00* (2013.01); *B63B 2757/00* (2013.01); *B63H 2021/205* (2013.01); *B63J 2003/002* (2013.01); *B63J 2003/008* (2013.01); *F05D 2220/31* (2013.01); *Y02T 10/70* (2013.01); *Y02T 10/7077* (2013.01); *Y02T 10/725* (2013.01); *Y02T 70/5236* (2013.01); *Y02T 70/5281* (2013.01)

(58) Field of Classification Search
CPC ........... B60L 3/0061; B63J 3/02; F01D 15/10; F01K 7/165; F01K 15/04; F01N 5/02; H02J 3/38
See application file for complete search history.

(56) References Cited

FOREIGN PATENT DOCUMENTS

| | | |
|---|---|---|
| EP | 1 966 040 B1 | 5/2009 |
| EP | 2 371 703 A1 | 10/2011 |
| EP | 2 057 068 B1 | 2/2012 |
| GB | 1159090 A | 7/1969 |
| GB | 2 442 770 A | 4/2008 |
| JP | H04-46892 A | 2/1992 |
| WO | 98/48497 A1 | 10/1998 |

OTHER PUBLICATIONS

Extended European Search Report and Opinion issued in connection with corresponding EP Application No. 16305376.2 dated Sep. 28, 2016.

* cited by examiner

ELECTRICAL POWER DISTRIBUTION SYSTEM, METHOD FOR POWERING A CORRESPONDING TASK, PROPULSION SYSTEM AND METHOD FOR A SHIP

FIELD OF THE INVENTION

The invention generally relates to systems for distributing electrical energy, and in particular to electrical energy distribution systems for supplying electrical charges onboard ships, e.g. the propulsion system, in the case of ships with electrical propulsion.

The invention also relates to a propulsion system for a ship equipped with such an electrical power distribution system.

BACKGROUND

Ship propulsion systems can be of various types. In order to reduce fuel consumption and pollutant emissions to the atmosphere, it has been proposed to use a principal heat engine that drives a line shafting with a propeller and a steam turbine that recycles the exhaust gas of the principal engine to drive the line shafting together with the heat engine.

Another type of propulsion system comprises a principal heat engine, e.g. a two-stroke diesel engine, dedicated to driving the line shafting and comprising an auxiliary electrical motor coupled to the line shafting and supplied by a distribution network.

The distribution network is itself supplied by generators driven by auxiliary heat engines.

The exhaust gas pressure of the principal heat engine is used to drive a power turbine, and the heat of the exhaust gas is used in a heat exchanger to drive a steam turbine. These two turbines are associated with a generator that supplies the distribution network.

The electrical power available in the onboard electrical system can be used to power various tasks onboard the ship or for its propulsion.

The systems recovering the heat energy generated during the operation of a heat engine, in this case a principal heat engine driving the line shafting or auxiliary heat engines to produce electricity, are referred to as WHRS (for "Waste Heat Recovery System").

More particularly, the pressure of the steam admitted into the steam turbine is controlled in order to act on the power consumed or produced.

The propulsion system provides for reversible operation.

According to a first operating mode, the coupled auxiliary electrical motor contributes to the drive of the propeller shaft by taking energy from the distribution network via a converter. This operating mode is generally referred to as PTI (for "Power Take IN").

The auxiliary motor can also operate in generator mode and deliver electrical energy to the distribution network via a converter. This operating mode is generally referred to as PTO (for "Power Take Off").

Thus, if the power supplied by the steam turbine increases to a high value such that the steam turbine is more heavily loaded, the auxiliary electrical motor coupled to the line shafting operates in motor mode so as to increase the amount of energy consumed.

On the other hand, if the pressure in the steam turbine decreases, the coupled auxiliary motor operates in generator mode via a converter in order to reinject the power required to supply the distribution network.

Another control technique of the WHRS system is to use a control device which generates a control signal of the steam turbine valve according to the speed and power.

BRIEF SUMMARY OF THE INVENTION

It has been found, however, that the control methods of WHRS systems according to the prior art suffer from a certain number of disadvantages, in particular because the efficiency of the system is relatively low, in particular as regards the maximum available energy value. Stability problems have also been observed during transient phases when the auxiliary generators operate in parallel or when the WHRS system is switched from PTI mode to PTO mode.

In view of the above, an object of embodiments of the invention is to overcome the disadvantages associated with the prior art and, in particular, to increase the maximum energy delivered by the WHRS system while improving the reliability of the system in operation and the transient phases.

An object of embodiments of the invention is, therefore, in a first aspect, a system for distributing electrical energy, comprising an assembly of electrical energy generators each driven by a heat engine and supplying a distribution network, means for recovering the heat energy generated during the operation of the heat engines and for vaporizing a working fluid, a steam turbine driven by the working fluid and associated with a generator connected to the distribution network for converting the recovered heat energy into electrical energy and at least one frequency converter arranged between the distribution network and an electrical load.

This distribution system further comprises means for controlling the frequency of the distribution network, where the flow rate of the vaporized working fluid is regulated to a maximum value.

According to another characteristic of the electrical energy distribution system according to embodiments of the invention, the control means comprise regulation means for regulating the frequency of the network between minimum and maximum frequency values.

In one embodiment, the regulating means comprise a phase-locked loop associated with an integral proportional type corrector.

In an embodiments, the or each frequency converter is a bidirectional converter capable of providing bidirectional power transfer.

In one embodiment, each converter comprises a filter input stage, an active rectifier circuit, a smoothing circuit and an inverter circuit.

In addition, each converter may include an output filtering inductor.

An object of embodiments of the invention is also, in a second aspect, a method of supply a charge via a system for distributing electrical energy, comprising an assembly of electrical energy generators each driven by a heat engine and supplying a distribution network, means for recovering the heat energy generated during the operation of the heat engines and for vaporizing a working fluid, a steam turbine driven by the working fluid and associated with a generator connected to the distribution network for converting the recovered heat energy into electrical energy and at least one frequency converter arranged between the distribution network and an electrical load, characterized in that the flow rate of the vaporized working fluid is regulated at maximum steam, and the frequency of the distribution network is controlled.

In an embodiment, the flow rate of the vaporized working fluid is regulated by opening a valve to the maximum for controlling the flow rate of the vaporized working fluid.

In an embodiments, the frequency of the network is regulated between minimum and maximum frequency values.

Finally, an object of embodiments of the invention is a propulsion system for a ship, comprising: a principal heat engine driving a line shafting; an auxiliary electrical motor coupled to the line shafting and supplied by an electrical power distribution network, said distribution network being supplied by auxiliary heat engines associated with electrical energy generators; means of recovering the heat energy generated during the operation of the propulsion system and for vaporizing a working fluid; a steam turbine driven by the working fluid and associated with a generator connected to the distribution network for converting the recovered heat energy into electrical energy, and at least one frequency converter arranged between the distribution network and the auxiliary electrical motor, and it comprises means for controlling the frequency of the distribution network, where the flow rate of the vaporized working fluid is regulated to a maximum value.

In one embodiment, the propulsion system also comprises an assembly of electrical power generators, each driven by a heat engine and supplying the distribution network.

It may also be provided that the propulsion system also comprises at least one bow thruster comprising an electrical motor capable of being supplied by the electrical power distribution network via the frequency converter, said network being powered by the heat engines when the bow thrusters are supplied by the said network.

The invention has the further object, according to a third aspect, of a method of propelling a ship via a propulsion system comprising a principal heat engine driving a line shafting, an auxiliary electrical motor coupled to the line shafting and supplied by an electrical power distribution network, said distribution network being supplied by auxiliary heat engines associated with electrical power generators, means for recovering the heat energy generated during the operation of the propulsion system and for vaporizing a working fluid, a steam turbine driven by the working fluid and associated with a generator connected to the distribution network for converting the recovered heat energy into electrical energy, and at least one frequency converter arranged between the distribution network and the auxiliary electrical motor, in which the flow rate of the vaporized working fluid is regulated to maximum steam and the frequency of the distribution network is controlled.

In an embodiments, according to this propulsion method, the distribution network is supplied by an assembly of electrical power generators each driven by a heat engine.

In one embodiment, at least one bow thruster comprising an electrical motor is supplied by the electrical power distribution network via the frequency converter, said network being powered by the heat engines when the bow thrusters are supplied by the said network.

BRIEF DESCRIPTION OF THE DRAWINGS

Other objects, characteristics and advantages of the invention will become apparent on reading the following description, given by way of non-limiting example, with reference to the accompanying drawings, in which.

DETAILED DESCRIPTION

Figure 1:
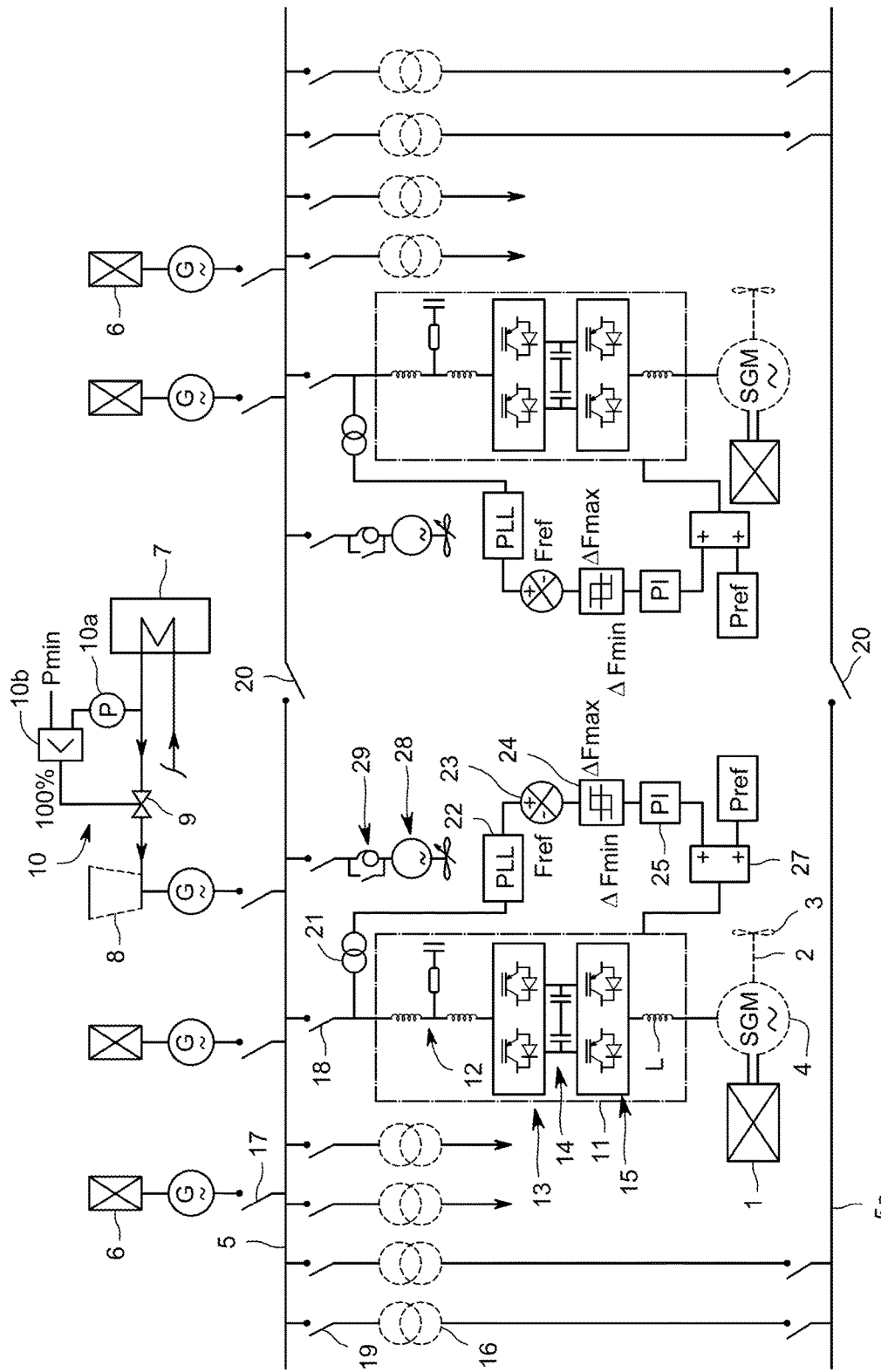
FIG. 1 illustrates the general architecture of a propulsion system for a ship comprising an electrical energy distribution system according to an embodiments of the invention.

This propulsion system firstly comprises heat engine 1 which drives motor shaft 2 provided with propeller 3 which is equipped with auxiliary electrical motor 4 of the SGM type (for "Shaft Generator Motor") which is supplied by a distribution network 5 of the AC type with a fixed frequency.

Network 5 is supplied by assembly of generators G, here four in number, each driven by auxiliary heat engines, e.g. 6, in this case two-stroke diesel engines.

In addition to distribution network 5 and auxiliary heat engines 6 associated with the generators, the electrical power distribution system is provided with means for recovering heat energy WHRS comprising heat exchanger 7 receiving the exhaust gas of auxiliary motors 6 for vaporizing a working fluid, in this case water, and steam turbine 8 receiving the steam from the exchanger via an adjustment valve 9 controlled by control device 10.

The control device acts on valve 9 so as to control it in the fully open position as soon as the steam pressure upstream of the steam turbine exceeds a Pmin minimum value. The control device thus comprises member 10a for measuring the pressure upstream of steam turbine 8 and comparator 10b which compares the measured pressure value with the minimum value for controlling valve 9.

As shown in the figure, auxiliary electrical motor 4 is supplied by distribution network 5 via frequency converter 11.

Converter 11 is a reversible converter and constitutes a fixed frequency-variable frequency converter for converting the available AC voltage on the fixed frequency network 5 into a variable frequency voltage for supplying auxiliary motor 4.

On the distribution network side, it comprises filter input stage 12, then active rectifier circuit 13, smoothing circuit 14, inverter circuit 15 and filtering inductor L.

Distribution network 5 essentially comprises a principal bus supplied by the auxiliary motors and the gas turbine associated with generators G.

It also comprises secondary bus 5a supplied by the principal bus via distribution transformers 16.

It can also be seen that the system comprises a number of circuit breakers 17, 18 and 19 capable of isolating distribution network 5 from generators G, frequency converter 11 and the distribution transformers.

Additional circuit breakers, e.g. 20, make it possible to isolate portions of principal supply bus 5 and secondary supply bus 5a.

Finally, the distribution system is supplemented by a stage for controlling the frequency of the distribution network.

This stage firstly comprises transformer 21 for measuring the voltage available on network 5 as well as phase-locked loop 22 for converting the measured voltage into frequency.

Comparator 23 provides a comparison of the frequency of the distribution network with a reference frequency FREF. Comparator 23 is associated, at the output, with hysteresis function 24 which, when active, reproduces the input at the output when the difference between the measured frequency and the reference frequency is above the thresholds ΔFmin and ΔFmax. When the difference is less than these thresholds, the output of the hysteresis function is zero.

The output of the hysteresis function is supplied to a proportional integral corrector 25 to maintain the frequency within the hysteresis band.

In addition, comparator 27 receives a power reference value Pref and the output of corrector 25 for controlling the frequency converter.

Finally, it must be noted that the distribution network is also intended to supply various electrical charges onboard the ship.

Indeed, the propulsion system is supplemented by complementary motors, in this case bow motors 28 driving a shaft carrying a propeller and supplied by network 5 via autotransformers 29.

The distribution system described above operates as follows.

In the first place, when auxiliary motors 6 operate, when the pressure of the steam admitted to the input of steam turbine 8 increases, this causes an acceleration of the steam turbine and a consequent increase in the frequency of distribution network 5, and the SGM motor is controlled to increase its active power consumption, if it is in motor mode, or to decrease its active power production, if it is in generator mode.

Depending on the consumption of auxiliary motor 4, or if the energy supplied by the steam turbine is available in excess, frequency converter 11 is controlled so as to reinject the available energy into the line shafting via auxiliary electrical motor 4.

If the steam pressure available at the input of the steam turbine decreases, the SGM motor is controlled to increase its active power consumption, if it is in engine mode, or to decrease its active power production, if it is in generator mode, in order to reduce the power generated by the steam turbine. The reversibility of frequency converter 11 enables it to switch from generator mode to motor mode or vice versa.

However, the pressure available at the input of the steam turbine is controlled and compared with a Pmin limit value (FIG. 1). As soon as the pressure exceeds this limit value, valve 9 is controlled in the fully open position and the frequency of the fixed frequency AC voltage of the distribution network 5 is regulated by acting at the power level supplied by the SGM motor via the frequency converter.

Finally, it is noted that the invention is not limited to the described embodiment.

Indeed, in the embodiment described with reference to FIG. 1, the propulsion system comprises bow thrusters, each comprising electrical bow motor 28 driving a shaft equipped with a propeller and supplied by the distribution network 5 via autotransformers 29.

Figure 3:
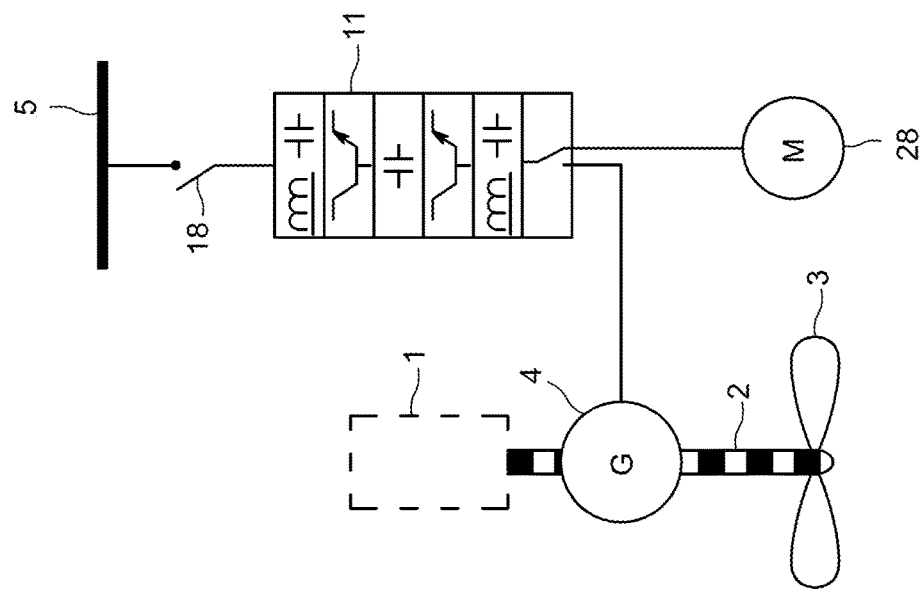
FIG. 3 illustrates an embodiment of a propulsion system according to the invention
Figure 2:
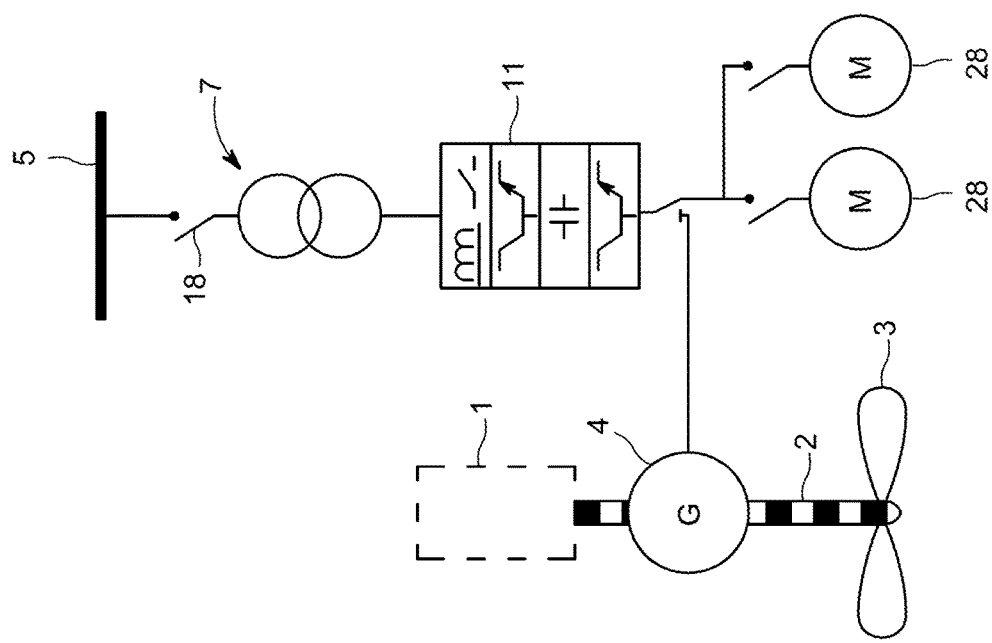
FIG. 2 illustrates an embodiment of a propulsion system according to the invention
Figure 4:
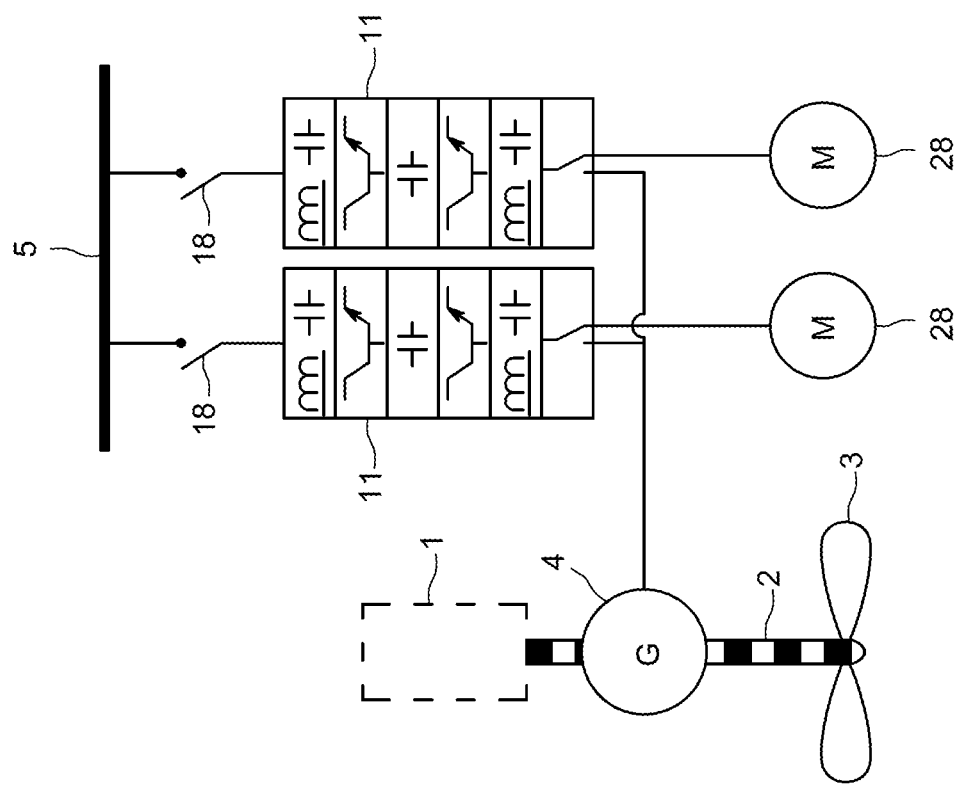
FIG. 4 illustrates an embodiment of a propulsion system according to the invention

As shown in FIGS. 2, 3 and 4, in which we recognize principal heat engine 1 equipped with auxiliary electrical motor 4 which jointly drive motor shaft 2 provided with propeller 3 and frequency converter 11 connected to the distribution network 5 via circuit breaker 18 and transformer T, it is also possible, as a variant, to supply bow motors 28 from converter 11.

The bow thrusters can thus be supplied by the frequency converter when the ship is maneuvering, i.e. when the ship is moving at low speed and distribution network 5 is powered by auxiliary motors 6 associated with the respective generators G.

In the embodiment of FIG. 2, a number of bow motors, in this case two, can be supplied by a single frequency converter.

In the embodiment of FIGS. 3 and 4, the bow motors can be supplied by a number of frequency converters 11 connected in parallel.

What is claimed is:

1. An electrical power distribution system, comprising:
   an assembly of electrical power generators, each driven by an auxiliary heat engine and supplying a distribution network;
   wherein, the distribution network provides an auxiliary electrical motor being operably connected to a motor shaft driven by a principal heat engine and having a propeller;
   a heat exchanger configured for recovering heat energy generated during the operation of the principal heat engine and the auxiliary heat engines and for vaporizing a working fluid;
   a steam turbine (i) configured to receive steam from the heat exchanger, (ii) driven by the working fluid and (iii) associated with a generator connected to the distribution network for converting the recovered heat energy into electrical energy;
   a controller configured for regulating the flow rate of the vaporized working fluid to a maximum value; and
   at least one frequency converter arranged between the distribution network and an auxiliary electrical motor, the at least one frequency converter being in operable connection with the controller;
   wherein the at least one frequency converter is configured to switch between a fixed frequency of the distribution network and a variable frequency; and
   wherein, when pressure at an input of the steam turbine exceeds a predetermined minimum pressure value, the controller facilitates the switch of the at least one frequency converter from the fixed frequency of the distribution network to the variable frequency for supplying energy to the auxiliary electrical motor.

2. A system according to claim 1, wherein the controller comprises a regulator for regulating the frequency of the distribution network between minimum and maximum frequency values.

3. A system according to claim 2, wherein the regulator comprises at least one phase-locked loop associated with proportional integral corrector.

4. A system according to claim 1, wherein the at least one frequency converter is a bidirectional converter capable of providing bidirectional power transfer.

5. A system according to claim 4, wherein the at least one frequency converter comprises filter input stage, active rectifier circuit, smoothing circuit and inverter circuit.

6. A system according to claim 5, wherein the at least one frequency converter further comprises output filtering inductor.

7. A method of supplying a charge via a system for distributing electrical energy, comprising:
   providing a distribution network, the distribution network including an auxiliary electrical motor being operably connected to a motor shaft driven by a principle heat engine and having a propeller;
   driving, by a plurality of auxiliary heat engines, an assembly of electrical energy generators that supply the distribution network;
   recovering the heat energy generated during the operation of the principle heat engine and the plurality of auxiliary heat engines and vaporizing a working fluid;

driving, by the working fluid, a steam turbine associated with a generator connected to the distribution network for converting the recovered heat energy into electrical energy and at least one frequency converter arranged between the distribution network and an auxiliary electrical motor, the frequency converter being configured to switch between a fixed frequency of the distribution network and a variable frequency; and regulating the flow rate of the vaporized working fluid at maximum steam such that when pressure at an input of the steam turbine exceeds a predetermined minimum pressure value, a controller facilitates the switch of the frequency converter from the fixed frequency of the distribution network to the variable frequency for supplying energy to the auxiliary electrical motor.

8. A method according to claim 7, wherein the regulating of the flow rate of the vaporized working fluid is regulated by opening a valve to the maximum for controlling the flow rate of the vaporized working fluid.

9. A method according to claim 7, wherein the controlling of the frequency of the distribution network is regulated between the minimum and maximum frequency values.

10. Propulsion system for a ship, comprising:

a principal heat engine driving a line shafting;

an auxiliary electrical motor coupled to the line shafting and supplied by an electrical power distribution network, the electrical power distribution network being supplied by a plurality of auxiliary heat engines associated with electrical energy generators;

a heat exchanger configured for recovering the heat energy generated by the propulsion system and for vaporizing a working fluid;

a steam turbine (i) configured to receive steam from the heat exchanger, (ii) driven by the working fluid and (iii) associated with a generator connected to the electrical power distribution network for converting the recovered heat energy into electrical energy, and a controller configured for regulating the flow rate of the vaporized working fluid to a maximum value; and at least one frequency converter arranged between the electrical power distribution network and an auxiliary electrical motor, the frequency converter being in operable connection with the controller;

wherein the frequency converter is configured to switch between a fixed frequency of the electrical power distribution network and a variable frequency; and wherein, when pressure at an input of the steam turbine exceeds a predetermined minimum pressure value, the controller facilitates the switch of the frequency converter from the fixed frequency of the electrical power distribution network to the variable frequency for supplying energy to the auxiliary electrical motor.

11. A propulsion system according to claim 10, further comprising at least one bow thruster comprising an electrical motor supplied by the electrical power distribution network via the frequency converter, the electrical power distribution network being powered by the principal heat engine and the plurality of auxiliary heat engines when the bow thrusters are supplied by the electrical power distribution network.

* * * * *